United States Patent
Amit et al.

(10) Patent No.: US 8,892,802 B2
(45) Date of Patent: Nov. 18, 2014

(54) ENHANCING INTERRUPT HANDLING IN A VIRTUAL ENVIRONMENT

(75) Inventors: Nadav Amit, Haifa (IL); Shmuel Ben-Yehuda, Haifa (IL); Abel Gordon, Haifa (IL); Nadav Yosef Har'El, Manof (IL); Alexander Landau, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/342,049

(22) Filed: Jan. 1, 2012

(65) Prior Publication Data

US 2013/0174148 A1 Jul. 4, 2013

(51) Int. Cl.
 G06F 13/24 (2006.01)
 G06F 13/32 (2006.01)
 G06F 9/455 (2006.01)
 G06F 9/46 (2006.01)

(52) U.S. Cl.
 USPC ............... 710/260; 718/1; 718/100; 710/267; 710/269

(58) Field of Classification Search
 None
 See application file for complete search history.

(56) References Cited

U.S. PATENT DOCUMENTS

| | | | | |
|---|---|---|---|---|
| 7,380,041 | B2* | 5/2008 | Belmar et al. | 710/260 |
| 7,853,744 | B2* | 12/2010 | Mahalingam et al. | 710/262 |
| 8,286,162 | B2* | 10/2012 | Neiger et al. | 718/1 |
| 2007/0157197 | A1 | 7/2007 | Neiger et al. | |
| 2009/0037936 | A1* | 2/2009 | Serebrin | 719/318 |
| 2010/0191885 | A1 | 7/2010 | Serebrin et al. | |
| 2011/0202699 | A1* | 8/2011 | van Riel | 710/267 |

OTHER PUBLICATIONS

Wing-Chi Poon & Aloysius K. Mok, "Bounding the Running Time of Interrupt and Exception Forwarding in Recursive Virtualization for the x86 Architecture", Technical Report VMware-TR-2010-003, Oct. 20, 2010.
Betak et al., "Reflective Virtualization Improving the Performance of Fully-Virtualized x86 Operating Systems", 2007.

* cited by examiner

*Primary Examiner* — Lewis A Bullock, Jr.
*Assistant Examiner* — Melissa Alfred
(74) *Attorney, Agent, or Firm* — Jinesh Patel; Eyal Gilboa

(57) ABSTRACT

Systems and methods for enhancing the handling of interrupts in a virtual computing environment are disclosed. A CPU is configured such that the CPU, when in a virtual machine (VM) mode, directs an interrupt to a VM. When in the VM context, a guest in the VM is run with a hypervisor interrupt descriptor table (hypervisor IDT) to determine how the interrupt should be handled. The hypervisor IDT directs an interrupt that is to be handled by the VM to an interrupt handler in a guest IDT without causing a transition to the hypervisor. If an interrupt is to be handled by the hypervisor, the hypervisor IDT causes a transition to the hypervisor.

17 Claims, 6 Drawing Sheets

ENHANCING INTERRUPT HANDLING IN A VIRTUAL ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee, or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to handling interrupts in a virtual environment, and more particularly to minimizing the overhead associated with handling interrupts in a virtual environment.

BACKGROUND

A virtual machine (VM) is a software implementation that enables logic code to be executed on top of the VM as if interfacing with a physical machine (e.g., a host hardware or computing system). Thus, a VM may provide a platform which supports the execution of logic code such as an operating system (OS) or be designed to support the execution of a particular software program. A program running on top of a VM may be also referred to as a guest. A guest program generally is given limited access to the physical machine resources as managed by the VM and a hypervisor.

A hypervisor is a software or firmware layer generally implemented over the physical machine to monitor one or more VMs hosted on the underlying hardware. The hypervisor is often implemented as a standalone software program that executes on the host hardware and provides virtualization for a guest program or OS running on top of a VM. Typically, a hypervisor controls the interactions between the guest programs running in the VM and the physical resources of the host hardware.

Certain events and interactions in a virtualized computing environment may result in the generation of signals referred to as interrupts, which may be communicated to the hypervisor to indicate that an event has occurred that needs to be handled by the hypervisor. Such an event may be caused by a guest program hosted by a VM running on top of the hypervisor, when the guest performs a sensitive instruction or by a device serviced by the guest program, for example.

Interrupts may be classified into two types. Hardware generated interrupts cause a processor (CPU) in a computing system to save the state of execution of a currently running program and to begin execution of another program (i.e., an interrupt handler) to handle the interrupt. Software generated interrupts are usually implemented as instructions, which cause a context switch in the CPU so that an interrupt handler can handle the interrupt.

A hardware interrupt generates a transition to the hypervisor context for handling. One or more transitions are handled synchronously by the hypervisor while the guest is temporarily paused. The hypervisor resumes the guest after handling the interrupts. As such, interrupt handling in a virtualized environment is associated with a relatively high level of overhead, due to the requirements for switching between execution contexts and the memory space used for saving the state of the execution, etc.

I/O intensive applications suffer the maximum virtualization penalty, if the generated hardware interrupts result in many transitions and switches between execution contexts at the hypervisor level or the guest level. As per prior art, the hypervisor configures the mode of operation to cause a transition to the hypervisor when a hardware interrupt arrives in guest mode. The virtualization penalties may be attributed to the overhead associated with switching between the guest and the hypervisor contexts, the CPU cache becoming polluted with data for two different contexts, and the execution delay due to the hypervisor having to handle the interrupts while the guest is in a paused state.

SUMMARY

For purposes of summarizing, certain aspects, advantages, and novel features have been described herein. It is to be understood that not all such advantages may be achieved in accordance with any one particular embodiment. Thus the disclosed subject matter may be embodied or carried out in a manner that achieves or optimizes one advantage or group of advantages without achieving all the advantages as may be taught or suggested herein.

In accordance with an embodiment, a method for enhancing the handling of interrupts in a virtual computing environment is disclosed. A CPU is configured such that the CPU, when in a virtual machine (VM) mode, directs an interrupt to a VM. When in the VM context, a guest in the VM is run with a hypervisor interrupt descriptor table (hypervisor IDT) to determine how the interrupt should be handled. The hypervisor IDT directs an interrupt that is to be handled by the guest to an interrupt handler in a guest IDT without causing a transition to the hypervisor. If an interrupt is to be handled by the hypervisor, the hypervisor IDT causes a transition to the hypervisor.

In accordance with an embodiment, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with an embodiment.

DETAILED DESCRIPTION OF EXEMPLARY EMBODIMENTS

In the following paragraphs, numerous specific details are set forth to provide a thorough description of various embodiments. Other embodiments may be practiced without these specific details or with some variations in detail. In some instances, some features are described in less detail so as not to obscure other aspects. The level of detail associated with each of the elements or features should not be construed to qualify the novelty or importance of one feature over the others.

In accordance with one embodiment, an interrupt descriptor table (IDT) may be used to handle an interrupt in an exemplary embodiment. An IDT is a data structure used by a processor (e.g., an x86 architecture) to implement an interrupt vector table to determine the correct response to interrupts (received from one or more devices) or exceptions, for example. A programmable interrupt controller (PIC) may be used to translate an interrupt to a vector.

A PIC may, for example, be used to combine several sources of interrupts onto one or more CPU lines, while allowing priority levels to be assigned to its interrupt outputs. When a device has multiple interrupt outputs to assert, the device will assert them in the order of their relative priority. A PIC may handle priorities in multiple modes (e.g., hard priorities, rotating priorities, and cascading priorities).

In one embodiment, the processor hardware virtualization extensions may support different modes of handling external interrupts. Depending on implementation, the mode of operation may not be configured per interrupt. Therefore, interrupts coming from a device, while the guest is running, may cause a transition to the hypervisor which then forwards the interrupts to the guest. When the guest processes an interrupt, it also acknowledges it. This process is referred to as end of interrupt (EOI).

The EOI process adds an additional transition to the hypervisor context. The hypervisor may transition to the hypervisor context each time the guest performs an EOI, because the hypervisor may virtualize the guest's interrupt controller (e.g., PIC) and isolate or protect the physical hardware. To limit the above-noted virtualization overhead, in one embodiment, the number of transitions between the hypervisor and the guest contexts or the cost of handling the related interrupts are reduced as provided in further detail below.

Figure 1:
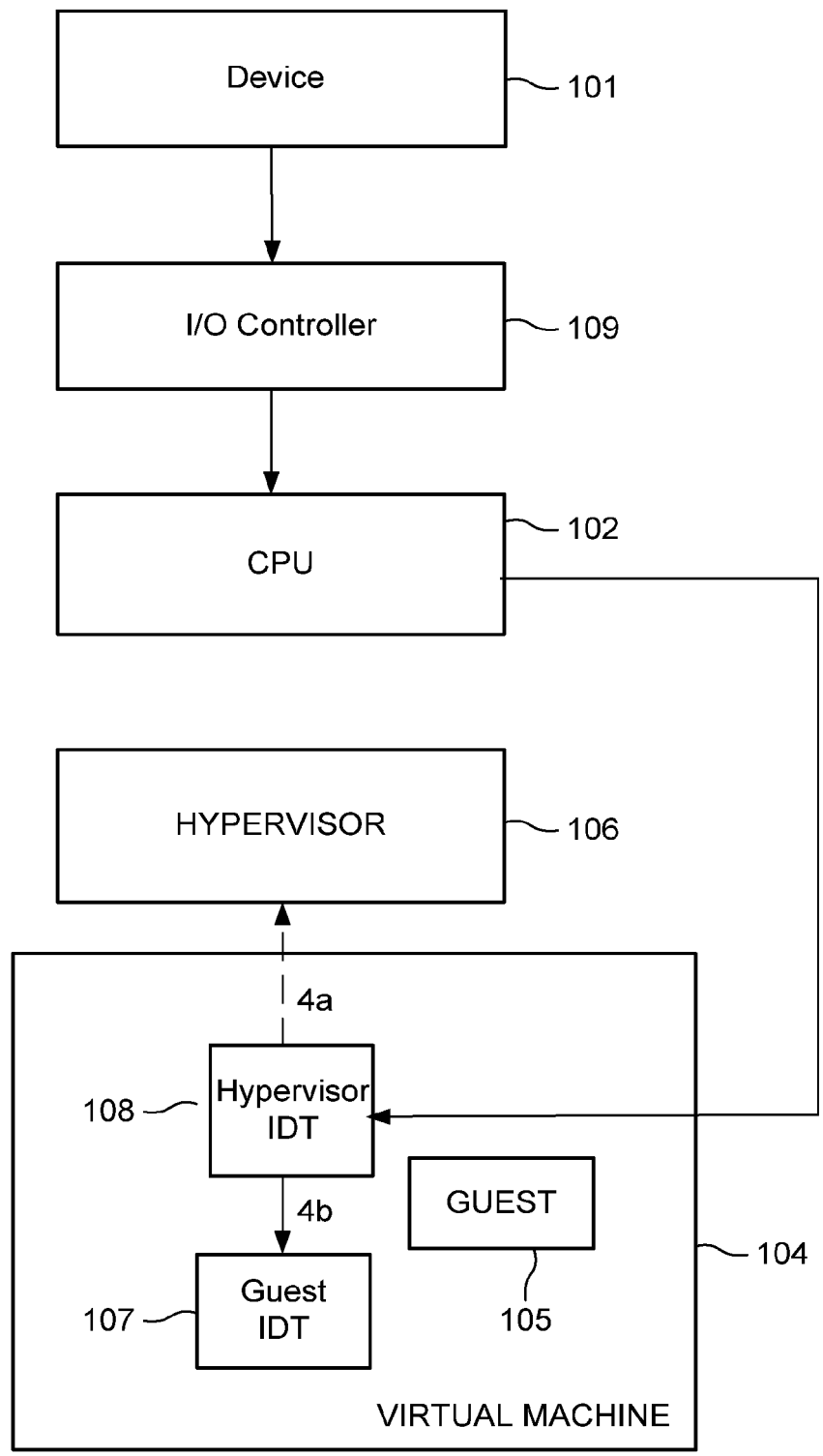
FIG. 1 is a block diagram of a virtualized computing environment in which an interrupt is handled in accordance with one embodiment.

Referring to FIG. 1, an exemplary interrupt handling configuration is illustrated, according to one embodiment, in which a hypervisor 106 is executed over a CPU 102 to manage the CPU 102 resources for a VM 104. A guest 105 (e.g., a program, or software, or an OS) may be executed on the VM 104 with access to computing resources as managed by hypervisor 106. The VM 104 may include a guest interrupt descriptor table (IDT) 107 to determine how to handle certain interrupts received while the CPU 102 is running in the guest mode.

A device 101 serviced by the VM 104 may deliver an interrupt to an I/O controller 109 (e.g., an advanced programmable interrupt controller (APIC). The I/O controller 109 translates the interrupt to an interrupt vector and delivers the interrupt vector to the CPU 102. The hypervisor 106 may configure the CPU 102 mode of operation to deliver the interrupts to the guest 105 without causing a transition to the hypervisor 106. That is, if the interrupt arrives while the CPU 102 is in guest mode (i.e., executing instructions for guest 105), the interrupt is delivered to the VM 104 which includes a hypervisor interrupt descriptor table (i.e., a hypervisor IDT) 108.

The guest operates based on the hypervisor IDT 108, while the interrupt is still under control of the hypervisor 106. The hypervisor 106 configures the hypervisor IDT (also referred to as shadow IDT) 108 to cause a transition if the interrupt needs to be handled by the hypervisor 106. Otherwise, the hypervisor IDT 108 delivers the interrupt to the handler specified in the guest IDT 107. The hypervisor IDT 108 is controlled by the hypervisor 106, but the hypervisor IDT 108 resides in the memory space allocated to the VM 104, and as such the VM 104 has direct access to it, and transition to hypervisor context is not required.

According to the content of the hypervisor IDT, it is determined whether it is the responsibility of the hypervisor 106 or the VM 104 to handle the received interrupt. If the interrupt is to be handled by the VM 104, then the interrupt is handled according to the information included in the guest IDT 107 without the CPU 102 having to switch out of the guest mode. If the interrupt is to be handled by the hypervisor 106, then the CPU 102 will switch out of the guest 105 context to the hypervisor context and the interrupt will be handled by the hypervisor 106 as provided in further detail below.

Figure 2:
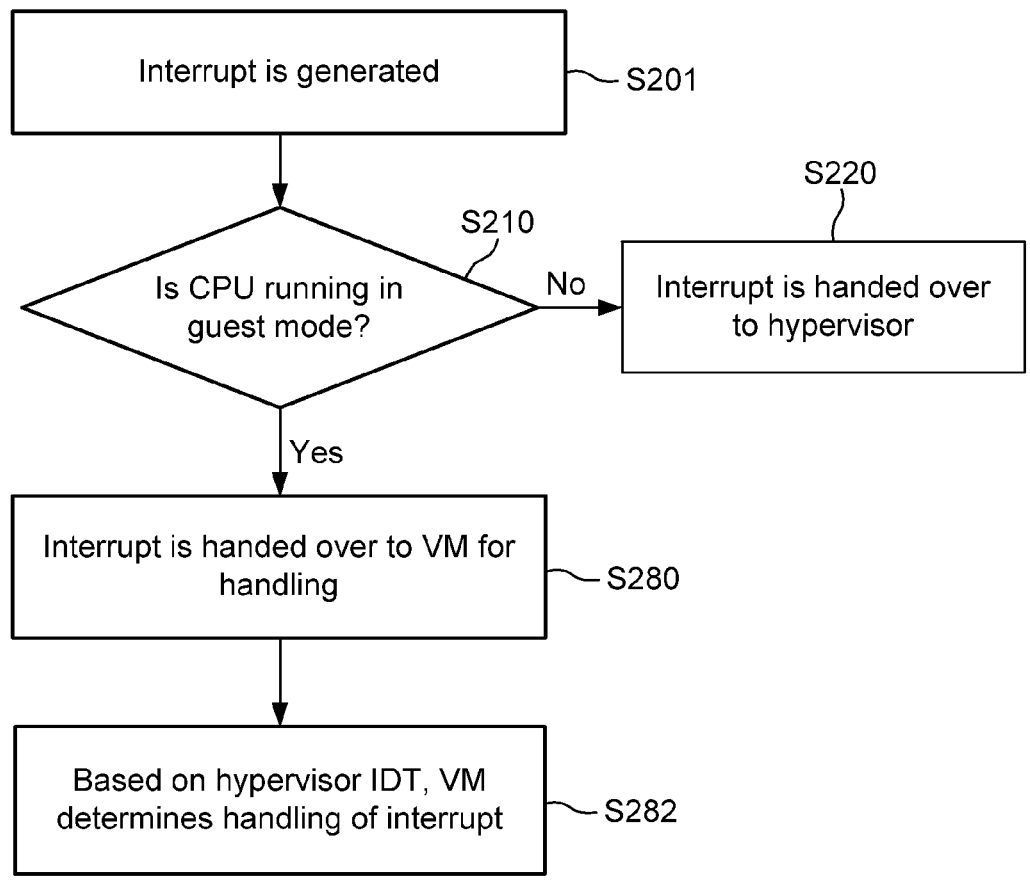
FIG. 2 is a flow diagram of a method of handling an interrupt in a virtualized computing environment in accordance with one embodiment.

FIG. 2 illustrates a method for interrupt handling, according to one embodiment. When an interrupt is generated (S201), the CPU 102 mode is checked (S210) to determine if the CPU 102 is running in the guest mode. If the CPU 102 is not running in guest mode, then the interrupt is handed over to the hypervisor 106 for handling (S220). If the CPU 102 is running in the guest mode, however, then the interrupt is handed over to VM 104 for handling (S280). Based on information included in hypervisor IDT 108, VM 104 determines how to handle the interrupt (S282).

Figure 3:
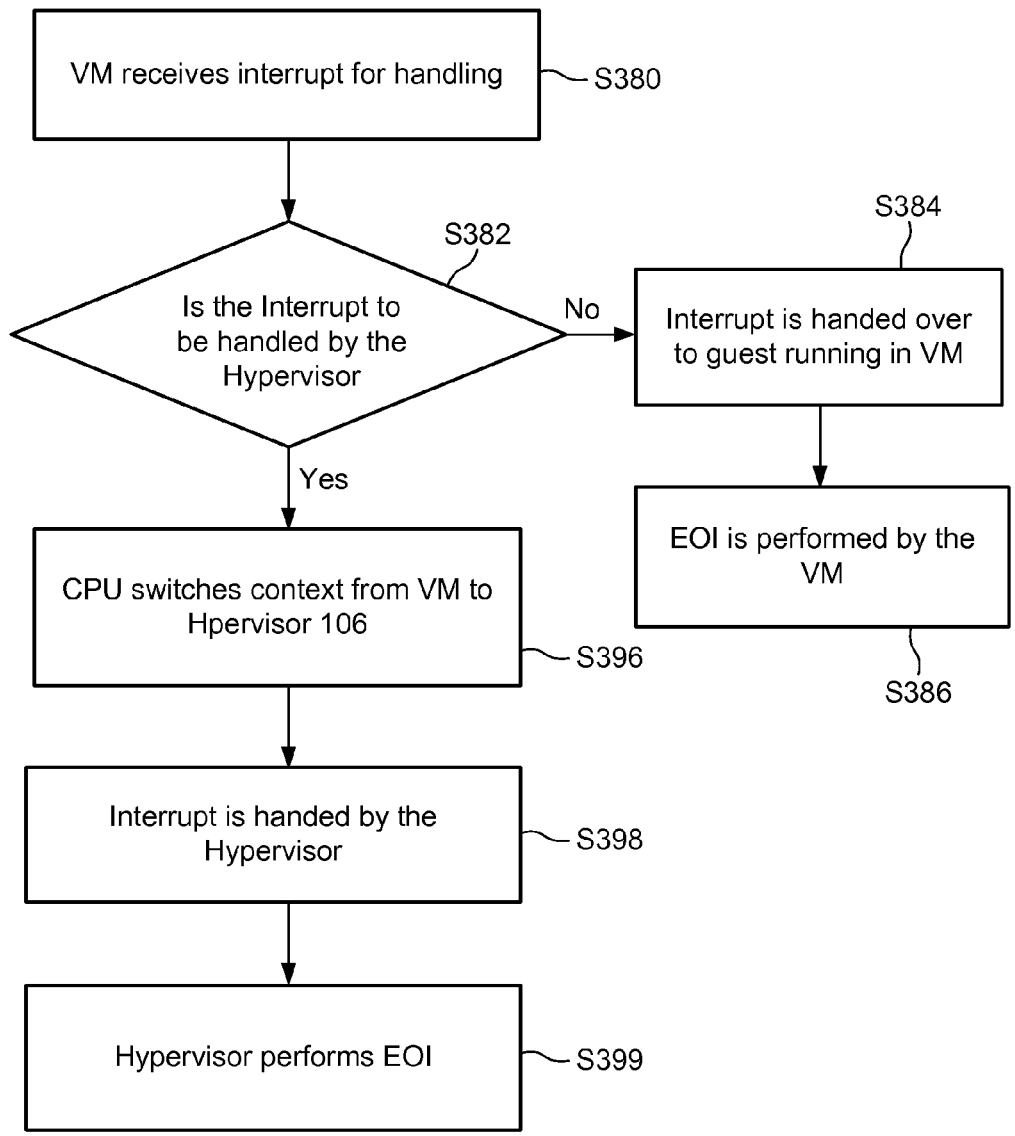
FIGS. 3 and 4 are flow diagrams of one or more methods of handling an interrupt in a virtualized computing environment, in accordance with one embodiment.

Referring to FIG. 3, when VM 104 receives an interrupt for handling (S380), it is determined whether the interrupt is to be handled by the hypervisor 106 (S382). If the interrupt is not to be handled by the hypervisor 106, then the interrupt is handed over to the guest 105 running in the VM 104 (S384) and EOI is performed by the guest 105 (S386). If the interrupt is to be handled by the hypervisor 106, then the CPU 102 switches context from the VM 104 to the hypervisor 106 (S396). The interrupt is handled by the hypervisor 106 (S398) and the hypervisor 106 performs the EOI (S399).

In one embodiment, the hypervisor 106 may map the hypervisor IDT 108 to a guest address space by way of a driver in the guest 105 allocating memory for the hypervisor IDT 108 and passing the address to the hypervisor 106. The driver may be a dedicated driver or part of a non-dedicated driver. The hypervisor 106 may inject a guest system call that allocates memory to the VM 104 or use the same memory area allocated for the guest IDT 107 also for the hypervisor IDT 108. Optionally, the hypervisor 106 may overwrite the guest IDT 107 with the content of the hypervisor IDT 108. The hypervisor 106 may also expose extra pages of a device's base address register that will be mapped by the guest OS 105 and used for the hypervisor IDT 108.

Figure 4:
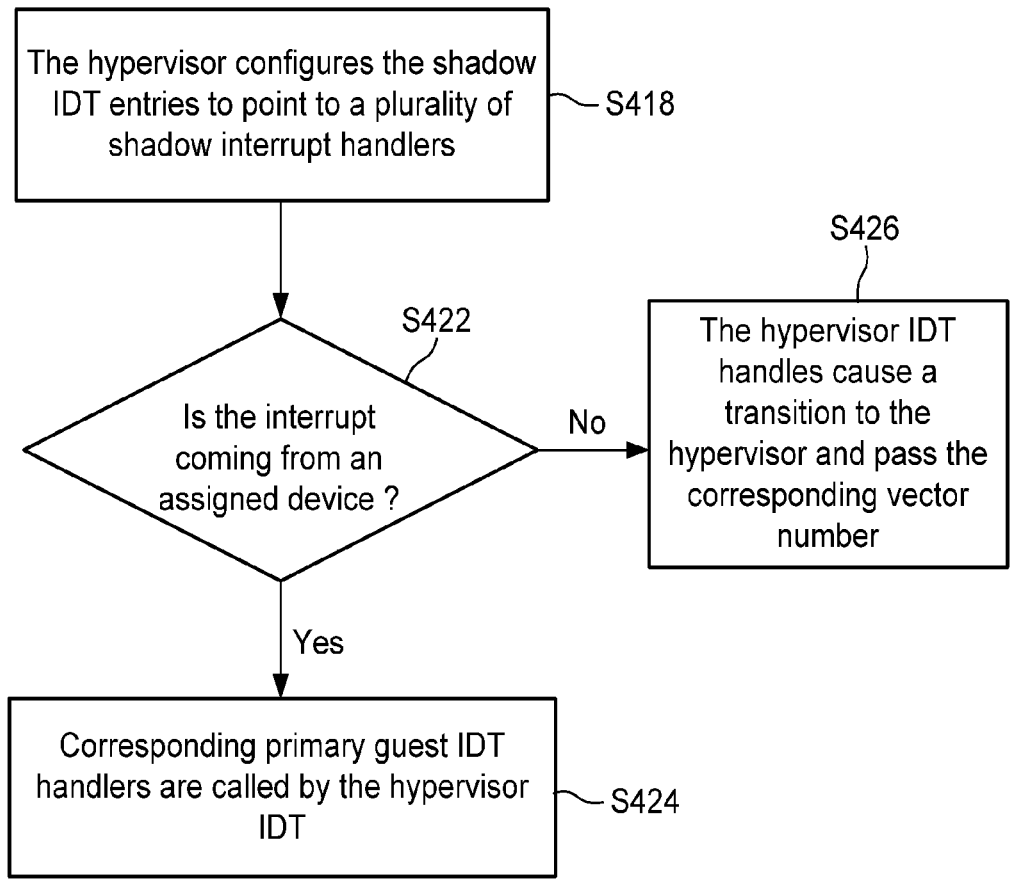

FIG. 4 illustrates an exemplary method for configuring the hypervisor IDT 108 in a virtual computing environment where a guest 105 and a hypervisor 106 are running. Once the hypervisor IDT 108 is mapped to a guest address space, the hypervisor 106 configures the hypervisor IDT entries to point to a plurality of secondary (i.e., shadow) interrupt handlers (S418). If the interrupt originates from an assigned device 101 (S422), then the corresponding primary guest IDT 107 handlers are called by the hypervisor IDT 108 (S424).

If the interrupt does not originate from an assigned device then the hypervisor IDT 108 handlers may cause a transition to the hypervisor 106 and pass the corresponding vector number for a shadow interrupt handler to the hypervisor 106 (S426) (e.g. by using a VMCALL instruction or any other trappable instruction). Alternatively, the corresponding hypervisor IDT 108 entries may be configured as "non-present" and cause a "non-present" exception that causes a transition to the hypervisor, or the hypervisor IDT 108 may be configured with a smaller size and cause a general protection exception that causes a transition to the hypervisor 106.

It is noteworthy that the delivery of external interrupts coming from an assigned device 101 without incurring any transition to the hypervisor 106 may be achieved by:
  a. Configuring the CPU 102 to deliver external interrupts to the guest IDT 107 while the guest 105 is running; and
  b. Running the VM 104 with a hypervisor IDT 108 controlled by the hypervisor 106 instead of the guest IDT 107; and
  c. Configuring the hypervisor IDT 108 to forward interrupts belonging to assigned devices directly to the guest IDT 107 (i.e., no transition needed) and to cause a transition to the hypervisor 106 for interrupts received from unassigned devices, as provided in further detail below.

If it is determined that a received interrupt is not from an assigned device, in one example, the hypervisor IDT 108 entries may be configured to point to the guest IDT handlers and change a Boolean value or flag (e.g., a present bit). For interrupts coming from the assigned device 101, the present bit may be set to 1, for example. For other interrupts, the present bit may be set to 0, for example.

Furthermore, as noted briefly earlier, the hypervisor 106 may trap a non-present exception to cause a transition when interrupts arrive to IDT entries with the present bit set to 0, for example. The vector number which causes the non-present exception may be stored in the CPU 102 memory and may be obtained by the hypervisor 106.

The hypervisor 106 may configure the CPU 102 before running the guest 105 with some settings. For example, the guest IDT register (IDTR) may be pointed to the hypervisor IDT 108. The virtual machine specification may be configured to deliver external interrupts to the guest IDT 107. Timer preemption may be enabled to cause a transition in case the guest 105 disables interrupts for a long period.

In one embodiment, the hypervisor 106 may trap and emulate a CPU instruction used to load the hypervisor IDT 108. When the guest 105 loads a new IDT (e.g., an IDT mapped to an infrequent event), the hypervisor 106 may reconfigure the corresponding hypervisor IDT 108. In addition, the hypervisor 106 may write-protect the guest IDT 107 to trap any changes.

Interrupts and IDT vectors corresponding to the assigned device 101 may be different in the hypervisor 106 and the guest 105. For example, the hypervisor 106 may use a vector "X" and the guest may use a vector "Y" for the assigned device interrupt. In one embodiment, the CPU 102 will deliver the interrupt to vector "X", even when the guest is running. When the guest 105 is running, the hypervisor 106 may use a vector remapping mechanism to invoke the handler of vector "Y" when the interrupt arrives to vector "X". The hypervisor 106 may use any of the following methods to remap IDT vectors.

In one embodiment, shadow handlers may be configured to call the original guest handlers corresponding to a different vector (e.g., a shadow handler for vector X may call an original guest handler for vector Y). In another embodiment, the pointers in the hypervisor IDT 108 may be changed (e.g., hypervisor IDT 108 entry for vector X may point to the original guest handler for vector Y). In another embodiment, the vector number may be converted as part of the guest handler. This is also known as para-virtualization (e.g., modifying the guest).

Depending on implementation, the hypervisor 106 may use one or more of the following mechanisms to remap vectors of the hypervisor IDT 108 to corresponding vectors of the guest IDT 107:
  a. Configuring shadow handlers to call to the original guest handlers corresponding to a different vector (e.g., shadow handler for vector X calling the original guest handler for vector Y);
  b. Changing the pointers in the hypervisor IDT 108 (e.g. hypervisor IDT 108 entry for vector X points to the original guest handler for vector Y); or
  c. Para-virtualization (modified guest): convert the vector number as part of the guest handler.

The hypervisor 106 may consider remapped vectors when injecting virtual interrupts. If the hypervisor 106 wishes to inject a virtual interrupt to vector X (which is re-mapped to the handler of vector Y), then the hypervisor 106 may cause original guest handler corresponding to X to be invoked. This may be done by swapping between the vectors and injecting Y instead of X (e.g., delivering Y will invoke X handler). Alternatively, the original X vector may be remapped to an unused vector Z, and the hypervisor 106 will inject Z when it wishes to deliver an interrupt to the original guest "X" handler.

Even when interrupts corresponding to the assigned device 101 may be handled directly by the guest 105, sometimes the interrupts are delivered while the hypervisor 106 is running. In such cases, the hypervisor 106 may re-inject the interrupt (i.e., remap the interrupt to a different IDT vector) when the guest 105 is resumed.

When an external interrupt that is not related to the assigned device is received, if the hypervisor 106 was running when the interrupt arrived, then the interrupt is handled by the CPU. Otherwise, the guest 105 may cause a transition. After the transition, the hypervisor 106 may recreate the interrupt by generating a software interrupt with the corresponding vector number.

The hypervisor 106 may inject virtual interrupts (i.e., interrupts not coming from an assigned device) to the guest 105. In this case, the interrupt may be handled directly by the guest 105 without causing a transition to the hypervisor 106. The hypervisor 106 may use any of the following methods to skip causing a transition when virtual interrupts are injected. In an embodiment, a memory flag shared between the VM 104 and the hypervisor 106 may be used to indicate when a virtual interrupt is being injected. In an embodiment, the guest IDT 107 may be used when virtual interrupts are injected to avoid causing a transition and the CPU mode may be configured to cause a transition to the hypervisor 106 if an external interrupt arrives.

The hypervisor IDT 108 and shadow handlers may be mapped into the guest 105 address space. The hypervisor 106 may use write protection bits for the corresponding memory pages to protect them from malicious guests. For CPUs supporting hardware MMU virtualization, the pages may be protected using a nested page table controlled by the hypervisor 106. Otherwise, the pages may be protected using the shadow page tables.

For interrupts belonging to an assigned device, acknowledgement of the interrupts or End of Interrupt (EOI) may be allowed to occur in the physical hardware without incurring any transition to the hypervisor 106. For other interrupts, there may be a transition to the hypervisor 106.

a. If the hypervisor 106 did not inject an interrupt (the interrupt was generated by an assigned device), then the CPU 102 is configured to run such that the VM 104 may be allowed to perform an EOI directly on the host hardware. This can be done using two mechanisms (1) paravirtualization and giving access to the EOI register, or (2) using x2APIC. With x2APIC, the hypervisor configures the EOI MSR BITMAP so as not to cause an exit.
  b. If the hypervisor 106 did injected an interrupt, then the CPU 102 is configured to run such that there may be a transition to the hypervisor context each time the VM 104 is asked to do EOI.

In one embodiment, the hypervisor 106 allows the guest 105 to acknowledge interrupts coming from the assigned device 101 without a transition. For other interrupts, there may be a transition. The hypervisor 106 may use any of the following methods for exit-less EOI for interrupts coming from the assigned device. In one embodiment, if the machine supports x2 APIC, the EOI may be allowed in the physical APIC (i.e., without transition), while virtual interrupts are not being injected (i.e., a transition is caused when a virtual interrupt is injected). In another embodiment, the guest code responsible for executing the EOI may patch with a hypervisor controlled routine that verifies if the EOI may be linked to the physical APIC (i.e., if the interrupt arrives from an assigned device) or cause a transition for virtual injected interrupts.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, and alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5:
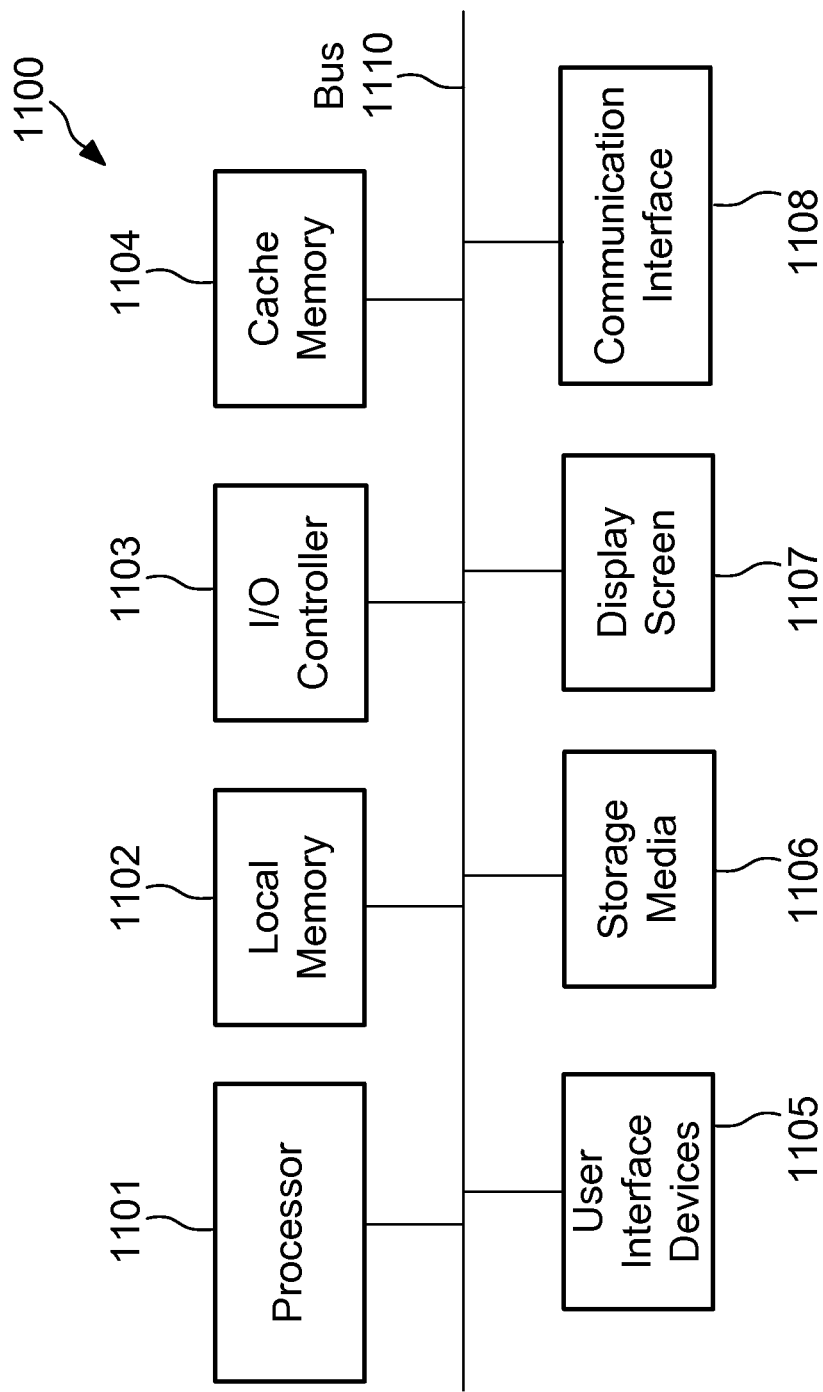
FIG. 5 is an exemplary block diagram of a hardware environment in which the disclosed systems and methods may operate, in accordance with one embodiment.
Figure 6:
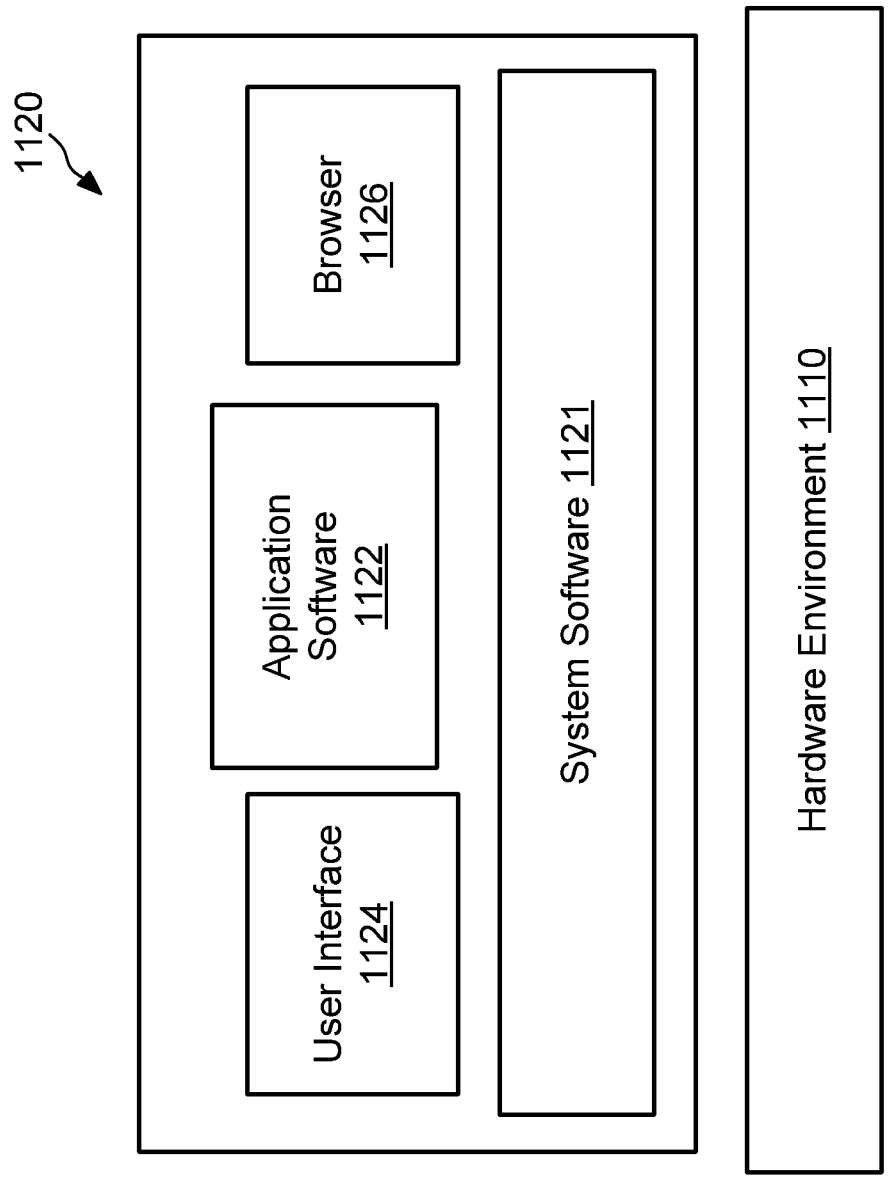
FIG. 6 is a block diagram of an exemplary software environment in which the disclosed systems and methods may operate, in accordance with one embodiment.

Referring to FIGS. 5 and 6, a computing system environment in accordance with an exemplary embodiment may be composed of a hardware environment 1110 and a software environment 1120. The hardware environment 1110 may comprise logic units, circuits or other machinery and equipment that provide an execution environment for the components of software environment 1120. In turn, the software environment 1120 may provide the execution instructions, including the underlying operational settings and configurations, for the various components of hardware environment 1110.

Referring to FIG. 5, the application software and logic code disclosed herein may be implemented in the form of computer readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 6, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wire line, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for enhancing the handling of interrupts in a virtual computing environment, comprising:
    determining whether a CPU is running in guest mode, wherein a guest is executed over a virtual machine (VM) and the VM is supported by a hypervisor running on the CPU;
    responsive to determining that the CPU is running in guest mode, forwarding an interrupt to the VM over which the guest is executed; and
    responsive to determining that the CPU is not running in guest mode, forwarding an interrupt to the hypervisor to handle;
    wherein in the guest mode, the guest is executed over the VM with a hypervisor interrupt descriptor table (hypervisor IDT) mapped to the guest address space, such that the VM is able to use the hypervisor IDT to handle the interrupt,
    wherein, in response to the VM determining, according to the entries in the hypervisor IDT, that the interrupt is generated by a physical device assigned to the guest, the VM forwards the interrupt to the guest to be handled by an interrupt handler in a guest IDT,
    wherein, in response to the VM determining, according to the entries in the hypervisor IDT, that the interrupt is not generated by a physical device assigned to the guest, the VM causes the CPU to transition to the hypervisor, wherein transitioning to the hypervisor includes passing a first interrupt vector number corresponding to the hypervisor IDT,
    wherein, in response to the CPU transitioning to the hypervisor, the hypervisor invokes a second interrupt vector corresponding to a second guest to which the physical device is assigned, and routes the interrupt to the second guest by remapping the first interrupt vector to a corresponding vector of a second guest IDT associated with the second guest, and
    wherein the remapping comprises converting the first interrupt vector number to a vector number used by the second guest's interrupt handler code.

2. The method of claim 1, wherein, for generated by a device assigned to the guest, the guest performs an end of interrupt (EOI) directly on the CPU.

3. The method of claim 2, comprising one or more of the following:
    allowing the EOI on the host hardware; or a guest code responsible for executing the EOI patching with a hypervisor controlled logic unit.

4. The method of claim 1, wherein, if the interrupt does not originate from a device assigned to the guest, the CPU transitions to the hypervisor and the hypervisor handles the interrupt.

5. The method of claim 4, comprising one or more of the following:
    the hypervisor IDT handler passing a vector number of an interrupt handler to the hypervisor; or
    configuring the hypervisor IDT to cause a "non-present" exception; or
    configuring the hypervisor IDT to cause a "general protection" exception.

6. The method of claim 1, further comprising:
    configuring the hypervisor IDT to cause a transition to the hypervisor if an external interrupt arrives while the guest is running, wherein the external interrupt is not assigned to the guest and the interrupt needs to be handled by the hypervisor;
    the hypervisor IDT generating a software interrupt to re-create the interrupt; and
    the hypervisor IDT re-injecting the software interrupt to the guest when the guest is resumed.

7. A computer program product comprising non-transitory computer readable storage medium having a computer readable program, wherein the computer readable program when executed on a computer causes the computer to perform a method comprising:
    determining whether a CPU is running in guest mode, wherein a guest is executed over a virtual machine (VM) and the VM is supported by a hypervisor running on the CPU;
    responsive to determining that the CPU is running in guest mode, forwarding an interrupt to the VM over which the guest is executed; and
    responsive to determining that the CPU is not running in guest mode, forwarding an interrupt to the hypervisor to handle;
    wherein in the guest mode, the guest is executed over the VM with a hypervisor interrupt descriptor table (hypervisor IDT) mapped to the guest address space, such that the VM is able to use the hypervisor IDT to handle the interrupt, wherein, in response to the VM determining that the interrupt is generated by a physical device assigned to the guest according to the entries in the hypervisor IDT, the VM forwards the interrupt to the guest to be handled by an interrupt handler in a guest IDT;

wherein, in response to the VM determining that the interrupt is not generated by a physical device assigned to the guest according to the entries in the hypervisor IDT, the VM causes the CPU to transition to the hypervisor, wherein transitioning to the hypervisor includes passing a first interrupt vector number corresponding to the hypervisor IDT, wherein, in response to the CPU transitioning to the hypervisor, the hypervisor invokes a second interrupt vector corresponding to a second guest to which the physical device is assigned, and routes the interrupt to the second guest by remapping the first interrupt vector to a corresponding vector of a second guest IDT associated with the second guest, and wherein the remapping comprises converting the first interrupt vector number to a vector number used by the second guest's interrupt handler code.

8. The computer program product of claim 7, wherein for interrupts generated by a device assigned to the guest, the guest performs an end of interrupt (EOI) directly on the CPU.

9. The computer program product of claim 7, the method further comprising:
configuring the hypervisor IDT to cause a transition to the hypervisor if an external interrupt arrives while the guest is running, wherein the external interrupt is not assigned to the guest and the interrupt needs to be handled by the hypervisor;
the hypervisor IDT generating a software interrupt to re-create the interrupt; and
the hypervisor IDT re-injecting the software interrupt to the guest when the guest is resumed.

10. The computer program product of claim 7, the method further comprising the hypervisor trapping and emulating a CPU instruction used to load the hypervisor IDT.

11. The computer program product of claim 7, wherein if the interrupt does not originate from an assigned device, the CPU context is switched to the hypervisor context and the hypervisor handles the interrupt, the method further comprising one or more of the following:
the hypervisor IDT handler passing a vector number of an interrupt handler to the hypervisor; or
configuring the hypervisor IDT to cause a "non-present" exception; or
configuring the hypervisor IDT to cause a "general protection" exception.

12. A computer system for enhancing the handling of interrupts in a virtual computing environment when a CPU is in a guest mode, comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to determine whether a CPU is running in guest mode, wherein a guest is executed over a virtual machine (VM) and the VM is supported by a hypervisor running on the CPU;
responsive to determining that the CPU is running in guest mode, program instructions to forward an interrupt to the VM over which the guest is executed; and
responsive to determining that the CPU is not running in guest mode, forwarding an interrupt to the hypervisor to handle;
wherein in the guest mode, the guest is executed over the VM with a hypervisor interrupt descriptor table (hypervisor IDT) mapped to the guest address space, such that the VM is able to use the hypervisor IDT to handle the interrupt,
wherein, in response to the VM determining that the interrupt is generated by a physical device assigned to the guest according to the entries in the hypervisor IDT, the VM forwards the interrupt to the guest to be handled by an interrupt handler in a guest IDT;
wherein, in response to the VM determining that the interrupt is not generated by a physical device assigned to the guest according to the entries in the hypervisor IDT, the VM causes the CPU to transition to the hypervisor, wherein transitioning to the hypervisor includes passing a first interrupt vector number corresponding to the hypervisor IDT,
wherein, in response to the CPU transitioning to the hypervisor, the hypervisor invokes a second interrupt vector corresponding to a second guest to which the physical device is assigned, and routes the interrupt to the second guest by remapping the first interrupt vector to a corresponding vector of a second guest IDT associated with the second guest, and
wherein the remapping comprises converting the first interrupt vector number to a vector number used by the second guest's interrupt handler code.

13. The computer system of claim 12, wherein for interrupts generated by a device assigned to the guest, the guest performs an end of interrupt (EOI) directly on the CPU.

14. The computer system of claim 12, further comprising program instructions to trap and emulate a CPU instruction used to load the hypervisor IDT.

15. The computer system of claim 12, further comprising:
program instruction to configure the hypervisor to call the guest IDT handler; or
program instructions to change the pointers in the hypervisor IDT.

16. The computer system of claim 12, further comprising:
program instructions to configure the hypervisor IDT to cause a transition to the hypervisor if an external interrupt arrives while the guest is running, wherein the external interrupt is not assigned to the guest and the interrupt needs to be handled by the hypervisor;
program instructions to generate a software interrupt to re-create the interrupt; and
program instruction to re-inject the software interrupt to the guest when the guest is resumed.

17. The computer system of claim 12, wherein if the interrupt does not originate from an assigned device, the CPU context is switched to the hypervisor context, the hypervisor handles the interrupt, and the computer system further comprises one or more of the following:
program instructions to pass a vector number corresponding to a secondary interrupt handler to the hypervisor; or
program instructions to configure the corresponding hypervisor IDT entry to cause a "non-present" exception; or program instructions to configure the hypervisor IDT to cause a "general protection" exception.

* * * * *